United States Patent [19]

Holz

[11] 4,233,853

[45] Nov. 18, 1980

[54] BELT PULLEY

[76] Inventor: William G. Holz, 207 W. Vine, Lodi, Calif. 95240

[21] Appl. No.: 951,680

[22] Filed: Oct. 16, 1978

[51] Int. Cl.² .................. F16H 55/36; F16H 55/52
[52] U.S. Cl. ........................ 74/185; 474/191
[58] Field of Search .................. 74/214–216, 74/230.01, 230.3, 230.4, 230.5, 230.6, 230.7

[56] References Cited

U.S. PATENT DOCUMENTS

| | | | |
|---|---|---|---|
| 1,040,993 | 10/1912 | Bakke | 74/230.3 |
| 1,047,206 | 12/1912 | Grignard | 74/230.3 X |
| 1,196,921 | 9/1916 | Black | 74/230.6 |
| 1,691,993 | 11/1928 | Rogers | 74/230.3 X |
| 2,339,069 | 1/1944 | Gemeny | 74/230.6 |
| 2,356,026 | 8/1944 | Berry | 74/230.6 |
| 2,787,913 | 4/1957 | Hageline | 74/230.6 |
| 3,354,735 | 11/1967 | Holz | 74/230.7 |
| 3,363,476 | 1/1968 | Brown | 74/230.6 |
| 3,392,594 | 7/1968 | Van Gorp | 74/230.6 |
| 3,744,329 | 7/1973 | Frank | 74/230.1 |

*Primary Examiner*—Lawrence J. Staab
*Attorney, Agent, or Firm*—Warren, Chickering & Grunewald

[57] ABSTRACT

A belt pulley which is designed for marketing as a group of standard component parts adapted for customized assembly by the user to meet individual pulley requirements as to size, load capability, etc. The parts include a shaft, a plurality of disc-shaped members formed for coaxially mounting in longitudinally spaced relation on the shaft for rotation therewith and a plurality of elongated belt, sheet or other load, supporting members designed for demountable attachment to the support members to complete the assembly.

10 Claims, 12 Drawing Figures

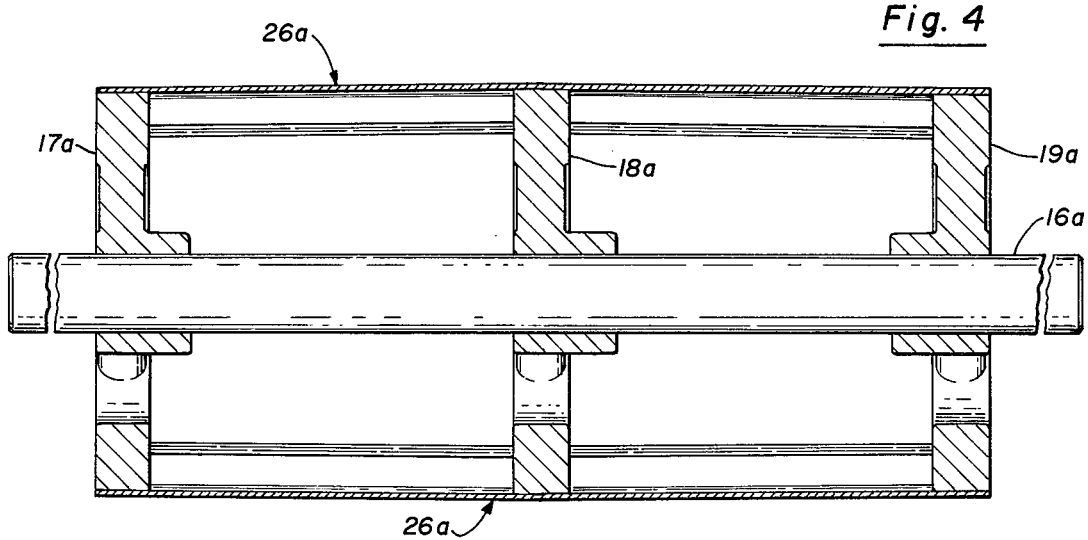

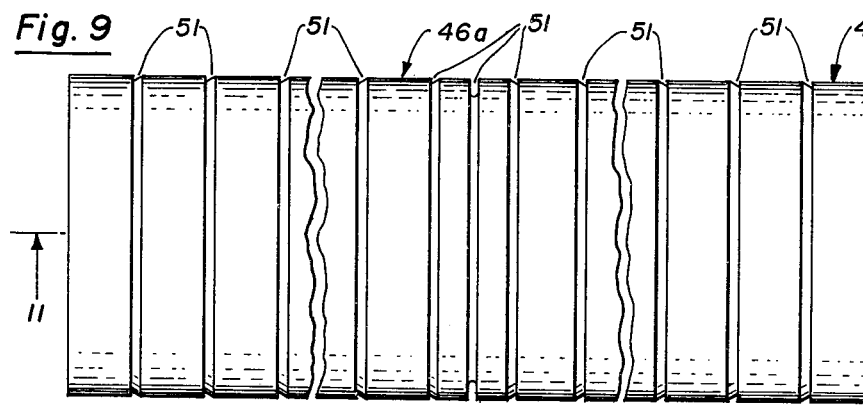
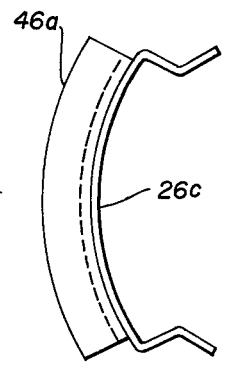
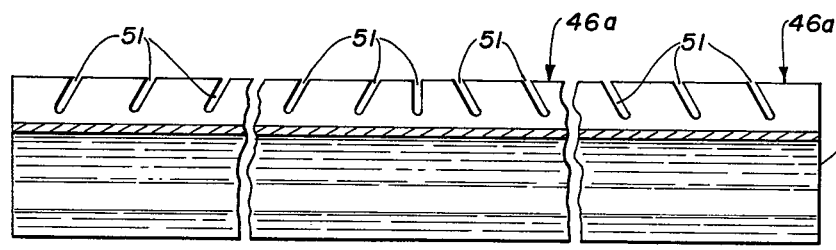
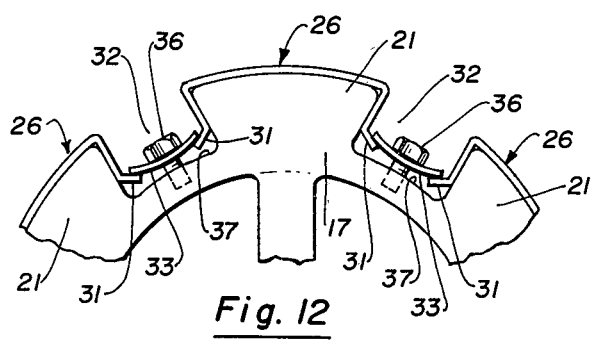

BELT PULLEY

BACKGROUND OF THE INVENTION

1. Field of Invention

The invention relates to belt pulleys particularly those having replaceable rubber lagging for improving belt grip or friction, and to the open style, wing type pulley.

2. Description of Prior Art

A common form of belt pulley is made from tubing or a rolled cylinder that forms the shell of the pulley which is made in standard diameters and lengths. Where rubber lagging is to be added to improve traction, the pulley shell may be sent to a rubber company for bonding a layer of rubber to the outer surface of the cylinder. Other alternatives are available for the addition of pulley lagging, see for example my earlier U.S. Pat. Nos. 3,354,735 and 3,789,682, where strips of rubber lagging are designed for demountable securing on the pulley surface, the latter system having the advantage of permitting renewal when the lagging becomes worn or damaged.

As above noted, the solid cylindrical shell type pulley is of necessity manufactured in particular sizes, diameters and lengths, and the manufacturer is accordingly required to make a large number of different size pulleys to supply user requirements and pulley distributors are similarly required to carry a large inventory of pulleys. Another disadvantage of the solid shell type pulley is its inability to free itself from the buildup of material which is likely to occur in many applications on the inside surface of the belt and which inevitably is carried by the belt around the pulley with consequent wear and abrasion of the pulley and belt and misalignment of the belt. The so-called wing type pulley shown in some of the patents noted below provides a desired self-cleaning action but are subject to premature wear due to minimum bearing surface and are normally not designed for traction type applications and also have the same disadvantage of the solid shell type pulley, namely, the requirement to manufacture the finished pulley in a variety of sizes to supply user requirements.

The inventor is familiar with the following prior art U.S. Pat. Nos. which constitute the most pertinent art known to him and which serve to illustrate the novelty of the present invention: 177,298; 505,810; 1,040,993; 1,691,993; 2,339,069; 2,603,099; 3,046,805; 3,168,781; 3,220,272; 3,363,476; 3,392,594; 3,744,329.

SUMMARY OF THE INVENTION

An object of the present invention is to provide a belt pulley of the character described which may be readily fabricated by the user from a minimum number of standard components to provide a customized pulley meeting the user's specific need for length, diameter, and load-bearing capability, thus minimizing the inventory of different pulley sizes required to be manufactured and stocked to meet the variety of pulley requirements. The pulley design of the present invention permits the user to immediately make up from inventory any one of a number of pulley sizes which the user may require.

Another object of the present invention is to provide a belt pulley of the character above which embodies a gear tooth drive principle which produces superior traction qualities, especially effective in wet or slippery conditions, while, at the same time providing a longer life, improved traction and smoother belt movement than the so-called wing type design. The present pulley provides self-cleaning by permitting the ready escape of material which may cause abrasion and premature wear and misalignment problems.

A further object of the present invention is to provide a belt pulley of the character described which may be efficiently mass produced at modest cost enabling a variety of pulley sizes to be inexpensively made up precisely to desired shape from a minimum number of standard inventory parts, including rubber lagging, thus eliminating the necessity of shipping pulleys to rubber fabricators for addition of lagging.

Still another object of the present invention is to provide a belt pulley of the character described which while providing improved traction in applications where traction is required, is at the same time adapted for use as processing rolls, e.g. in spreader, press, perforating feeding, and centering applications. Special patterns may be ideally and inexpensively formed in the rubber lagging to provide desired processing, especially to replace conventional Lorig type rolls where special grooves must be machined or cast at relatively high cost to the user.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

BRIEF DESCRIPTION OF THE DRAWINGS

FIG. 4 is a longitudinal cross-sectional view of a modified form of the pulley.

FIG. 5 is an end elevation of a further modified form of the pulley.

FIG. 6 is a cross-sectional view taken substantially on the plane of line 6—6 of FIG. 5.

FIG. 7 is an end elevation of another form of the pulley.

FIG. 8 is a longitudinal cross-sectional view taken substantially on the plane of line 8—8 of FIG. 7.

FIG. 9 is a front elevation of one form of one of the parts of the pulley.

FIG. 10 is an end elevation of the part shown in FIG. 9.

FIG. 11 is a cross-sectional view taken substantially on the plane of line 11—11 of FIG. 9.

FIG. 12 is a fragmentary end elevation of a further modified form of the pulley.

DETAILED DESCRIPTION OF THE INVENTION

Figure 3:
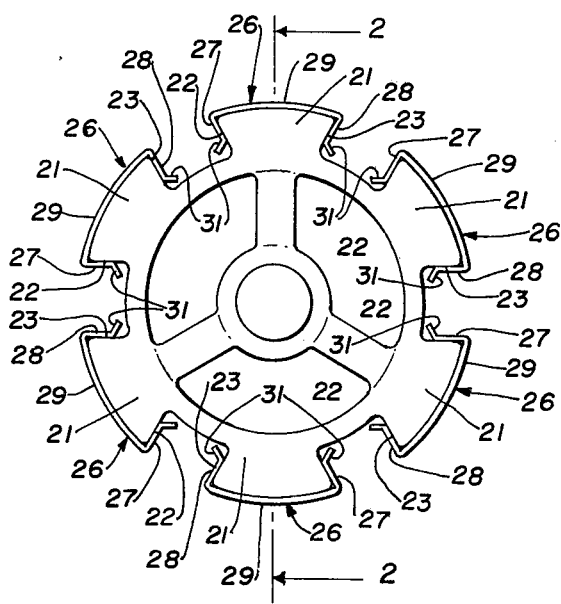
FIG. 3 is an end elevation of the pulley shown in FIG. 1.

The belt pulley of the present invention comprises, briefly, a shaft 16; a plurality of disc-shaped members 17, 18 and 19 adapted for coaxial mounting in longitudinally spaced relation on shaft 16 for rotation therewith, each of the members having a plurality of circumferentially spaced radially outstanding protuberances 21, each having opposite circumferentially spaced sides 22 and 23; and a plurality of elongated channel-shaped members 26 having spaced apart walls 27 and 28 and a connecting wall 29 and dimensioned to embrace the protuberances with side walls 27 and 28 in bearing support with sides 22 and 23 and with the connecting wall 29 positioned at the radially outer sides of the disc members and extending longitudinally therebetween for supporting engagement with a belt entrained around channel members 26. Preferably, the opposite protuberance sides 21 and 22 diverge outwardly, as seen in FIG. 3, and side walls 27 and 28 are formed for resilient compressible engagement with sides 22 and 23 for clamping the channel members on the protuberances. Also, preferably, the outer periphery of the protuberances are arcuately curved and connecting walls 29 are similarly curved to provide substantially circular segments around shaft 16.

The channel members 26 are, preferably, formed of resilient sheet metal, such as sheet steel, with the connecting wall 29 of concavo-convex form, convex outwardly with respect to sides 27 and 28 and the pulley. To facilitate the resilient spreading of side walls 27 and 28 in mounting the channel members on the protuberances, the free edges of the side walls, opposite connecting wall 29, are here flared out in edge flanges 31. The disc members 17-19 may be driven endwise into the channel members or the latter may be sprung over and around the protuberances 21. Means, as illustrated in FIG. 12, may be used for locking the channel members 26 on the disc-shaped members 17-19 by engaging and locking edge flanges 31 against dislodgment of the channel members from protuberances 21. As here shown, the disc members are formed with recesses 32 defined by and between protuberances 21, and the locking means comprises bridging members 33 dimensioned for mounting in recesses 32 and for spanning and bearing upon flanges 31 therein of adjacent channel members 26; and a member, here bolt 36, threaded through a medial portion of bridging members 33 and into the disc members 17-19 at the bases 37 of recesses 32. Members 33 are, preferably, formed of resilient material, such as spring steel so as to move into an arcuate shape, as seen in FIG. 12, when tightened down, by bolts 36 upon edge flanges 31.

Figure 1:
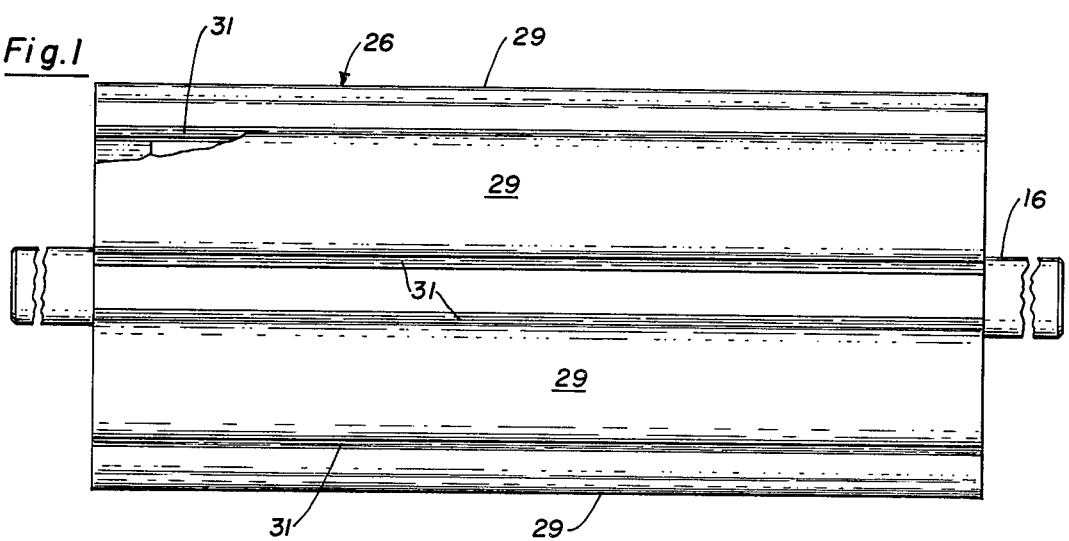
FIG. 1 is a side elevation of a belt pulley constructed in accordance with the present invention.
Figure 2:
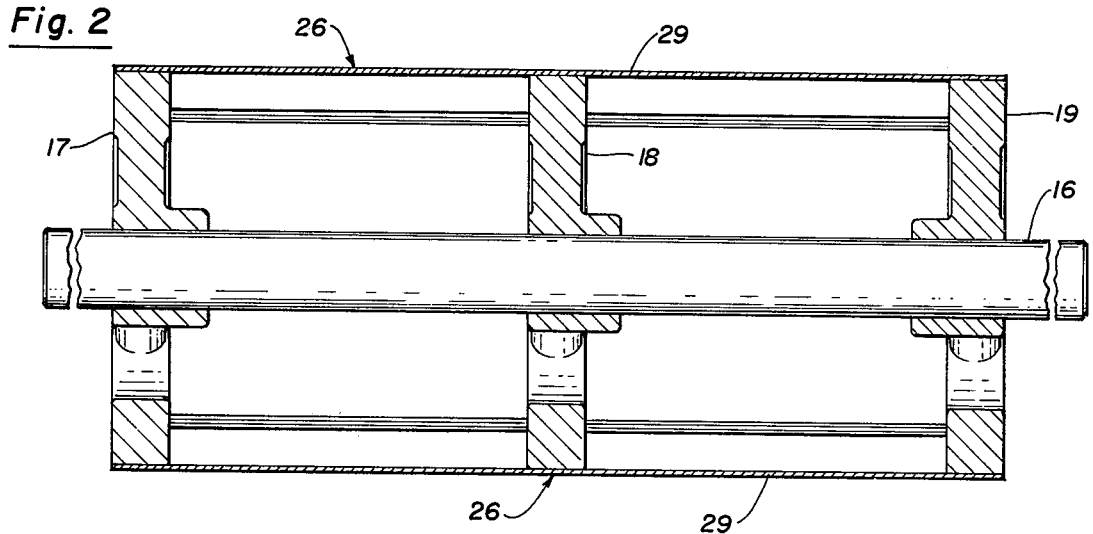
FIG. 2 is a longitudinal cross-sectional view of the belt pulley shown in FIG. 1 and is taken substantially on the plane of line 2—2 of FIG. 3.

While the pulley, illustrated in FIGS. 1-3, are made up of three disc-shaped members 17-19, it will be understood that the number of disc-shaped members used in making up the pulley will depend upon the size and load requirements. For example, in smaller size pulleys only two of the disc-shaped support members would typically be used. For longer pulleys, one or more medial support members would normally be used. The use of a center support member 18a may be advantageously used, as seen in FIG. 4, to provide a crown-shaped pulley. As seen in FIG. 4, the pulley comprises a pair of end disc members 17a and 19a of similar diameter and adapted for mounting on shaft 16a at the opposite ends of the pulley, and an intermediate disc member 18a having a diameter larger than members 17a and 19a and functioning to spring outwardly the medial portion of channel members 26a providing a relatively enlarged pulley diameter thereat affording a "crown" shaped pulley. The structure illustrated in FIG. 4 otherwise follows the structure of FIGS. 1-3. By means of the structural arrangement shown in FIG. 4, the usual flat pulley may be converted into a crown pulley, a combination not heretofore available without expensive machining or other metal forming operations.

Another feature of the present invention is the adaptability of the design to the use of reinforcing members 41, see FIG. 5, carried by the disc members 17b, 18b and 19b and extending therebetween at the underside of and supporting the connecting wall 29b of channel members 26b. As here shown, protuberances 21b are formed with radially extending slots 42 opening to the radially outer surfaces of protuberances 21b and reinforcing members 21 are dimensioned for mounting in slots 42. Members 41 may comprise simple elongated rectangular bars with their greatest dimension positioned radially at the underside of walls 29b of the channel members to provide desired stiffening action over the length of the spans between the support members 17a, 18a and 19a.

As an important feature of the present invention, rubber traction pads 46 may be readily mounted on or bonded to the outer surfaces of connecting walls 29c of the channel-shaped members, as illustrated in FIGS. 7 and 8 to provide important lagging to the pulley. Pads 46 may be easily and readily bonded to channel members which are to be furnished by the manufacturer with the lagging in place. The customer thus has the option of assembling a pulley with or without the rubber lagging. In either case, the channel members will be furnished in standard lengths and the user may cut these members to the length of the pulley to be assembled. The arcuate shape of connecting wall 29c imparts a desired stiffness to the channel members and also affords a uniform thickness of rubber to provide traction pads 46 having a uniform circular configuration.

The addition of the rubber pads to the pulley opens up a wide range of possibilities for the production of special processing rolls wherein the rubber pads may be readily molded with appropriate grooves, metal inserts or other surface configurations to provide the processing step desired. An important application of this invention is the production of a Lorig type roll by the use of the pulley structure illustrated in FIGS. 9, 10 and 11. The Lorig type roll is used for self-aligning of a belt or strip of material transported over the pulley. Typically, these rolls comprise a cylinder having special grooves or slits machined into the outer periphery of the roll. Such operation is particularly difficult where attempts have been made to machine such slits into a rubber coated cylinder where machining is a costly, dirty, smoky operation with high heat buildup requiring cooling and other special techniques. The problem is greatly compounded in creating cylinders of various diameters and lengths. It has been found, however, that self-centering slots may be readily and most effectively molded in the relatively narrow segments of the rubber lagging. Of equal importance is the fact that the Lorig type cylinders have no significant forward traction, the design being totally concerned with alignment. In the present case, however, due to the peripherally spaced belt engaging members, very substantial traction qualities are obtained. Accordingly, the pulley of the present invention will provide both the alignment properties of the Lorig design and the traction features of the gear tooth design of the present invention. This quality is particularly important when operating under wet or sloppy conditions such as in the handling of items such as tomato paste, mud, muck, etc.

The Lorig, self-aligning, properties may be provided in the present pulley by molding or forming rubber pads 46a, as illustrated in FIGS. 9-11, with a plurality of grooves 51 extending circumferentially of the pulley and with the grooves on opposite end portions having depth dimensions convergently tapered outwardly towards a center plane of the pulley, as best seen in FIG. 11, where the grooves 51 on the left side of center slope upwardly and to the right, and the grooves on the right side of center slope upwardly and to the left. Pads 46a may be of one piece elongated form extending over the length of channel member 26c with grooves 51 extending transversely across the width of the pads, or a pair of similar pads may be mounted end to end with one pad reversed to provide the groove configuration noted.

As a further feature of the present invention, the disc-shaped support members in each of the various forms of the invention are formed as spoked wheels having openings therethrough which cooperate with the segmental open form of the pulley to provide for the ready escape of material which may be carried by the belt and which may fall to the interior side thereof. Optional means for locking the elongated belt supporting members to the supporting disc-shaped members include crimping, welding or bolting. Any such attaching means should permit subsequent removal and replacement of any or all of the elongated belt engaging members. Assembly of the disc-shaped members to the pulley shaft may be by keying, welding or taper-lock bushings.

The term belt pulley as used herein includes processing rolls.

What is claimed is:

1. A belt pulley comprising:
 a shaft;
 a plurality of disc-shaped members adapted for coaxial mounting in longitudinally spaced relation on said shaft for rotation therewith and each being formed with a plurality of circumferentially spaced radially outstanding protuberances, each having opposite radially extending circumferentially spaced sides;
 a plurality of elongated channel-shaped members having spaced apart side walls and a connecting wall and dimensioned to embrace said protuberances with said side walls in bearing support with said protuberance sides and said connecting walls positioned at the radially outer extremities of said protuberances and extending between said disc-shaped members for supporting engagement with a belt entrained around said channel-shaped members; and
 said channel-shaped members being formed of resilient sheet metal with said connecting wall of concavo-convex form, convex outwardly with respect to said side walls and pulley to provide a plurality of substantially circular segments about said shaft.

2. The pulley of claim 1, said opposite sides of each protuberance diverging outwardly; and
 said side walls being formed for resilient compressible engagement with said sides for clamping said channel-shaped members on said protuberances.

3. The pulley of claim 2, the free edges of said side walls opposite said connecting wall being flared out in edge flanges facilitating resilient spreading of said side walls in mounting said channel-shaped members on said protuberances.

4. The pulley of claim 3, and means adapted for securing to said disc members and formed and dimensioned for engaging and locking said flanges against dislodgment of said channel-shaped members from said protuberances.

5. The pulley of claim 4, said disc members being formed with recesses defined by and between said protuberances;
 said means comprising:
 bridging members dimensioned for mounting in said recesses and for spanning and bearing upon the said flanges therein of adjacent channel-shaped members; and
 a member adapted for securing a medial portion of each of said bridging members to said disc members at each of the bases of said recesses.

6. A pulley as defined in claim 1, comprising a pair of end disc members adapted for positioning at the opposite ends of said pulley and an intermediate disc member;
 said end disc members having similar diameters disposing of the opposite ends of said channel-shaped members at substantially equal radii to said shaft; and
 said intermediate disc member having a diameter larger than said end disc members and functioning to spring outwardly the medial portions of said channel-shaped members providing a relatively enlarged pulley diameter thereat affording a "crown" shaped pulley.

7. A pulley as defined in claim 6, the opposite sides of each protuberance diverging outwardly; and
 said side walls being formed for resilient compressible engagement with said sides for clamping said channel-shaped members on said protuberances.

8. The belt pulley of claim 1, said protuberances being formed with radially extending slots opening to the radially outer surfaces of said protuberances; and
 a plurality of reinforcing members supported on said disc members and extending therebetween at the underside of and supporting said connecting walls,
 said reinforcing members being dimensioned for being mounting in said slots.

9. The belt pulley of claim 1, and rubber traction pads bonded to the outer surfaces of said connecting walls and being formed with a plurality of grooves on opposite end portions of said channel-shaped members having depth dimensions convergently tapered outwardly toward a center plane of said pulley.

10. The belt pulley of claim 9, said pads being of elongated form extending over the length of said channel-shaped members.

* * * * *